US012022260B2

(12) United States Patent
Thomsen et al.

(10) Patent No.: US 12,022,260 B2
(45) Date of Patent: Jun. 25, 2024

(54) HEARING DEVICE COMPRISING AN ADJUSTABLE VENT

(71) Applicant: Oticon A/S, Smørum (DK)

(72) Inventors: Anders Højsgaard Thomsen, Smørum (DK); Karsten Bo Rasmussen, Smørum (DK); Svend Oscar Petersen, Smørum (DK); Edvinas Bureika, Smørum (DK); Christian Asp Mogensen, Smørum (DK); Troels Holm Pedersen, Smørum (DK); Gorm Dannesboe, Smørum (DK); Jacob Anders Roug, Smørum (DK); Mathias Bruun Larsen, Smørum (DK); Mikkel Nielsen, Smørum (DK)

(73) Assignee: Oticon A/S, Smørum (DK)

( * ) Notice: Subject to any disclaimer, the term of this patent is extended or adjusted under 35 U.S.C. 154(b) by 295 days.

(21) Appl. No.: 17/543,269

(22) Filed: Dec. 6, 2021

(65) Prior Publication Data

US 2022/0095058 A1 Mar. 24, 2022

Related U.S. Application Data

(62) Division of application No. 16/773,483, filed on Jan. 27, 2020, now Pat. No. 11,228,848.

(30) Foreign Application Priority Data

Feb. 7, 2019 (EP) .................................... 19155935

(51) Int. Cl.
*H04R 25/00* (2006.01)
*H04R 1/10* (2006.01)

(52) U.S. Cl.
CPC ........... *H04R 25/48* (2013.01); *H04R 1/1041* (2013.01); *H04R 25/505* (2013.01); *H04R 2225/61* (2013.01); *H04R 2460/11* (2013.01)

(58) Field of Classification Search
CPC .... H04R 25/48; H04R 1/1041; H04R 25/505; H04R 2225/61; H04R 2460/11;
(Continued)

(56) References Cited

U.S. PATENT DOCUMENTS 3,991,971 A 11/1976 Drake
2012/0082335 A1 4/2012 Duisters et al.
(Continued)

FOREIGN PATENT DOCUMENTS

DE 20 2018 107 151 U1 1/2019
EP 2 835 987 A1 2/2015
EP 3 328 097 A1 5/2018

*Primary Examiner* — Tuan D Nguyen
(74) *Attorney, Agent, or Firm* — Birch, Stewart, Kolasch & Birch, LLP

(57) ABSTRACT

A hearing device with an adjustable vent is disclosed. The device includes at least one microphone configured to provide an input signal representing sound, a processor configured to process the input signal and provide a processed signal, at least one loudspeaker configured to receive the processed signal from the processor and to provide an acoustic signal based on the processed signal to the ear of a user, an earpiece comprising a vent, and an electrically controllable valve configured to control the vent, and a valve control unit configured to receive one or more control signals in dependence of a current hearing situation of the hearing device, wherein the valve control unit is configured to adjust the electrically controllable valve in dependence of the one or more control signals to provide the vent to be in a state between an acoustically more open and an acoustically less open state.

15 Claims, 17 Drawing Sheets

(58) Field of Classification Search
CPC .................. H04R 25/652; H04R 25/70; H04R 2225/023; H04R 2225/025; H04R 2225/41; H04R 25/456; H04R 25/65
See application file for complete search history.

(56) References Cited

U.S. PATENT DOCUMENTS

| | | | |
|---|---|---|---|
| 2017/0370180 | A1 | 12/2017 | Manett et al. |
| 2018/0093269 | A1 | 4/2018 | Rachamim et al. |
| 2019/0215620 | A1 | 7/2019 | Albahri et al. |
| 2020/0322738 | A1 | 10/2020 | Elmedyb et al. |

HEARING DEVICE COMPRISING AN ADJUSTABLE VENT

CROSS-REFERENCE TO RELATED APPLICATIONS

This application is a Divisional of copending application Ser. No. 16/773,483, filed on Jan. 27, 2020, which claims priority under 35 U.S.C. § 119(a) to Application No. 19155935.0 filed in Europe on Feb. 7, 2019, all of which are hereby expressly incorporated by reference into the present application.

FIELD

The present disclosure relates to a hearing device comprising an adjustable vent, e.g. comprising a valve. More particularly, the disclosure relates to the hearing device configured to adjust said vent in response to a change in acoustic environment or to user actions, and to how said adjustable vent is designed. The hearing device may be constituted by or comprise a hearing aid.

BACKGROUND

Hearing devices, which are designed to be placed within an ear canal, are typically designed with a vent to avoid discomfort for the user (occlusion). There are cases in which no vent or only a small one are important design criteria, and there are other cases where the vent should be as big as possible. This vent size is in most available hearing devices constant during use (e.g. determined in advance of the use of the hearing device, e.g. customized to a user's needs), and if it is possible to change the vent size, it is usually done by changing some mechanical parts, such as domes in hearing aid devices. In some cases, it is beneficial to be able to change the vent size, e.g. in cases when the hearing device has no vent, or a vent with only a small opening, and a user starts talking Due to the occlusion effect, it may be uncomfortable for the user, and the option of adjusting the vent size (increasing its opening) would be attractive.

The general knowledge related to determining the vent size for a given hearing device style and a given need of a user for amplification is known in the field of hearing devices. It is known, for example, that better sound attenuation (or sounds from the outside) is achieved with a closed vent (it is used in headsets with higher attenuation which allows to, for example, play music quieter and make less impact on hearing). It is also beneficial to keep the vent closed in the case of a need for high amplification of lower frequencies. On the other hand, while a user of the hearing device is talking, an open vent is a better solution. In the area of a hearing aids, it is usually a compromise between different, mutually excluding conditions.

It is therefore a purpose of this invention to overcome some of the problems known from the prior art.

SUMMARY

It is an object of the present disclosure to provide a hearing device which is able to change the vent size in response to a change in a user hearing situation.

According to an aspect of the disclosure, a hearing device is provided, which is configured to be located fully or partially in or at an ear of a user. The hearing device comprises:

- at least one microphone configured to provide an input signal representing sound,
- a processor configured to process said input signal and provide a processed signal,
- at least one loudspeaker configured to receive said processed signal from said processor and to provide an acoustic signal based on said processed signal to the ear of a user,
- an earpiece comprising
  - a vent, and
  - an electrically controllable valve configured to control said vent, and
  - a valve control unit configured to receive one or more control signals in dependence of a current hearing situation of the hearing device, wherein said valve control unit is configured to adjust the electrically controllable valve in dependence of said one or more control signals to provide the vent to be in a state between an acoustically more open and an acoustically less open state.

A hearing device is thereby provided which is able to automatically regulate the valve (and vent) in response to a change in the current hearing situation by responding to the occurring control signals determining different conditions (e.g. hearing situations).

In a preferred embodiment, the electrically controllable valve is located in or form part of the vent. In this way, the valve enables that the vent can be opened or closed efficiently and in response to the one or more controls signals provided to the valve via the control unit.

The hearing device may comprise a feedback estimation unit and at least one of said one or more control signal may be obtained in dependence of an output of said feedback estimation unit. This enables to better predict feedback and keep it on a desired level by varying the vent size.

The at least one microphone may be configured to deliver said input signal as a control signal to said valve control unit. This allows to detect sounds, like pure tones, which may make it impossible to correctly detect conditions triggering, for example, the feedback estimation unit to emit a control signal. It is also possible that some other conditions (like response to high pitch) may influence the electrically controllable valve.

The hearing device may comprise an own voice detector configured to detect a user's voice, and wherein at least one of said one or more control signals is obtained in dependence of the output of said own voice detector. By the valve control unit being able to receive a control signal related to detection of own voice, the occlusion effect may be minimized That is, when a user speaks, the hearing aid is able to detect the voice of the hearing aid user. This triggers the valve control unit to emit a control signal to the valve forcing the valve to allow the vent to become more open. In this way, the occlusion that would arise if the vent was remained in a closed or partially closed position, is minimized.

In an embodiment, at least one of said one or more control signals is obtained in dependence of an input to the hearing device via an external device, wherein said input is for one of an audio streaming or a telephone call. This aspect may allow to automatically attenuate external sound enabling the user to listen to desired sounds from the external device much quieter. When listening to music this aspect allows a better reproduction of low frequency content.

The hearing device may be or comprise a hearing aid. In a hearing aid it may be especially beneficial to determine and control a vent size, due to user hearing impairment, which may result in better understanding of sounds, for example voice (e.g. improve speech intelligibility).

The processor may comprise a hearing loss compensation unit and at least one of said one or more control signals may be obtained in dependence of a gain set in said hearing loss compensation unit. This arrangement allows to better amplify frequencies chosen by the user or defined by a hearing care professional. It is especially important in the case of low frequency amplification.

In an embodiment, at least one of said one or more control signals is obtained in dependence of a user hearing loss, hearing aid type, and/or an ear mould. This arrangement allows to accordingly adjust the valve (and the vent) with respect to the hearing device type.

The valve control unit may be configured to control the electrically controllable valve to provide that the vent can be in an open state, in a closed state and in one or more states therebetween. This allows the hearing device to adjust more precisely to changes in the hearing situation.

The valve control unit may be configured to control the electrically controllable valve to provide that the more open and less open states of the vent are defined by upper and lower limits defined by a fitting software. It may be important that those limits override other control signals in the case where, for some reasons, being at least partially open or not fully open is more relevant than optimizing the vent with respect to other criteria.

The valve control unit may be configured to determine whether said valve is opened, partly opened or closed on a basis of a signal from said feedback estimation unit. It is especially important due to a difference between a real valve opening (air, sound passing through the valve) and acoustical opening (air, sound passing through the valve and between a hearing aid enclosure and an ear canal) which is more important in the case of hearing devices. It should also be noted that other acoustic routes may be present, like small gaps between ear piece and ear canal, which sum up with the real vent opening resulting in acoustic opening. In some cases, it may be more important to know the acoustic opening rather than the real valve opening.

In an embodiment, one or more control signals from said feedback estimation unit may comprise an impulse response of the feedback path. In this case known solutions from a control theory may be applied and therefore the whole solution may be defined more easily or a final effect may be predicted with better end results.

The valve control unit may be configured to apply a Fast Fourier Transformation to said impulse response to provide a frequency response of the feedback path. This may make it easier to implement different embodiments of the disclosure for some feedback controlling methods.

The valve control unit may be configured to control the vent in dependence of values of the frequency response of the feedback path at one or more selected frequencies or frequency ranges. In this case the hearing device will be able to, within some range determined by a construction of the valve, control the feedback with respect to one or more defined frequencies which may make it easier to implement or cause shorter delays improving a user's comfort.

The valve control unit may be configured to adjust said valve synchronously with a user's other hearing device (e.g. another hearing device of a binaural hearing system, e.g. a binaural hearing aid system). In the case when a user wears two hearing devices, it is possible that one device wasn't able to correctly determine the hearing condition. In this case the other hearing device may override the first one and decide how open or close the valve should be in this situation.

In an embodiment, at least one of said one or more control signals is obtained in dependence of a level estimate of a current acoustic environment of the hearing device. This allows to attenuate too loud environmental sounds. This is beneficial in the case when the hearing device is protecting a user's hearing or when those environmental sounds make it difficult or even impossible to listen to desired sounds from the hearing device.

In an embodiment the electrically controllable valve may be located in or form part of the vent. In this case size and/or mass of the device might be smaller. This is especially beneficial in hearing aids.

As described, the valve may be controlled via the one or more control signals to open or close a vent of a hearing device, such as a hearing aid. The valve may be implemented in a plurality of different ways, wherein in the following a series of examples of a valve is described. It should be noted that the details of the valve implementations into the vent is described in the description of the figures.

In summary, the vent may comprise in one embodiment a first vent portion and a second vent portion separated by the valve. The valve comprises a valve housing having an inner space comprising a rotatable ball being rotatable about a ball rotation axis, wherein the ball comprises a passage. A first opening of said valve housing connects the passage with the first vent portion, and a second opening of said valve housing connects the passage with the second vent portion. At a first rotation position of the ball, the ball blocks a connection between the first opening and the second opening, and at a second rotation position of the ball, the passage connects the first opening and the second opening and defining a passage axis. The valve further comprises an actuator configured to rotate the ball, and the valve control unit is configured to control and drive the actuator.

In one embodiment the vent may comprise a first vent portion and a second vent portion separated by the valve. A valve housing having an opening connecting the first vent portion with the second vent portion. The valve comprises a lid unit rotatable about a lid unit rotation axis. The lid unit comprises a cylinder side surface section and a supporting section extending toward the lid unit rotation axis. The lid unit rotation axis is in a center of an imaginary cylinder which comprises the side surface section. At a first rotation position of the lid unit it covers the opening, and at a second rotation position of the lid unit it uncovers the opening. The valve further comprises an actuator configured to rotate the lid unit, and the valve control unit is configured to control and drive the actuator.

In one embodiment the vent may be configured as part of a speaker unit of said hearing device. The speaker unit comprises a snout and within the snout the vent extends in a longitudinal direction of the snout, and is configured as a bore. The valve is configured to be arranged within said bore.

In one embodiment the valve may comprise a membrane configured to open the vent, in a membrane shrunken state, or close the vent, in a membrane extended state The membrane is configured to extend and shrink within the vent, wherein the membrane is an actuator and/or the valve comprises an actuator for controlling the membrane.

BRIEF DESCRIPTION OF THE DRAWINGS

The embodiments of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

Figure 1:
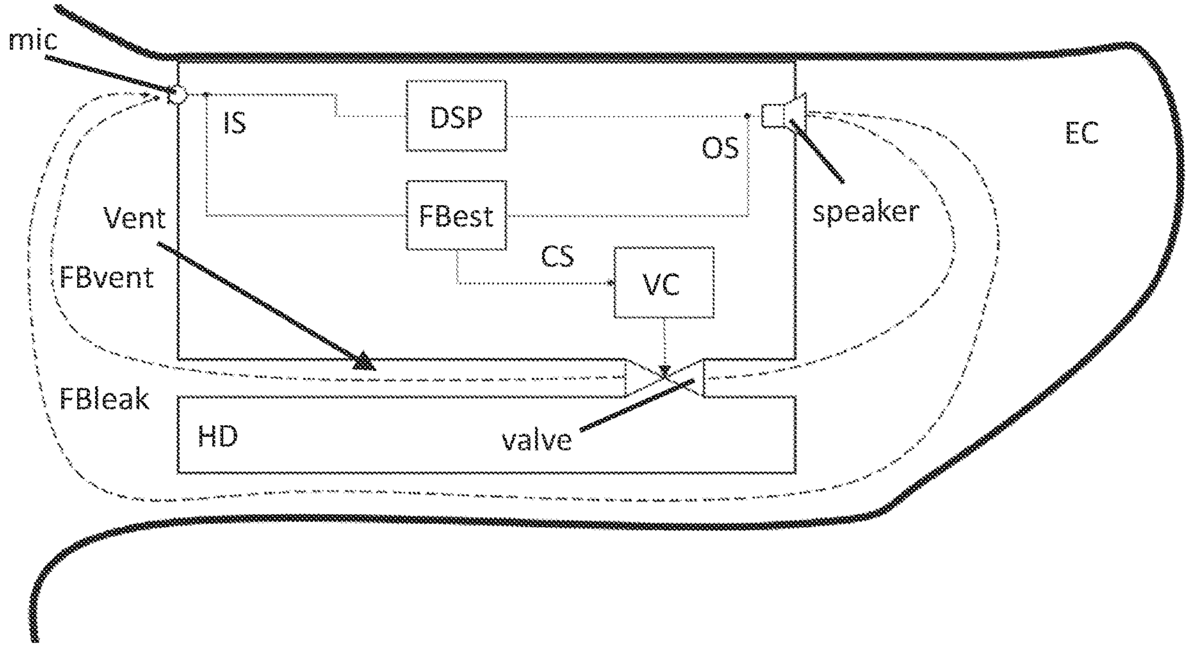
FIG. 1 shows a first example of a hearing device according to the present disclosure comprising a feedback estimation unit.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device.

The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

The present application relates to the field of hearing devices, e.g. hearing aids.

FIG. 1 shows an example of a hearing device (HD) according to the present disclosure. In this figure the hearing device (HD) is of a type ('style'), which fits completely inside an ear canal (EC) of a user, like for example a completely-in-canal (CIC) or an invisible-in-canal (IIC) hearing aid. The hearing device (HD) comprises an earpiece which comprises and fixes all elements in place. The ear piece (e.g. an ear mould, e.g. customized to a user's ear or ear canal) comprises a (through-going) vent forming a vent channel between the environment and the 'occluded volume' (between the ear piece and the ear drum). The hearing device (HD) comprises a microphone (mic) configured to provide input signal (IS) by converting a sound waveform into an electrical signal. The input signal (IS) is delivered to a processor, in the figure shown as digital signal processor (DSP), and to a feedback estimator unit (FBest). The processor (DSP) is configured to adjust input signal (IS) according to its (current) program, which may be programmed to simply amplify the input signal or to amplify selected frequencies by applying a determined gain (e.g. to compensate for a hearing impairment of the user). The input signal (IS) changed by the DSP becomes an output signal (OS), which is delivered to a loudspeaker (speaker) and to the feedback estimator (FBest). The loudspeaker is configured to convert the output signal (OS) to a sound waveform and to emit the sound waveform into the ear canal (EC) of the user. The feedback estimator unit (FBest) is configured to estimate an acoustic feedback from the loudspeaker (speaker) to the microphone (mic) on a basis of the output signal (OS) and the input signal (IS) (or a signal derived therefrom). In the particular configuration of FIG. 1, the feedback estimate provided by the feedback estimator unit (FBest) will be an estimate of the signal transfer function through the loudspeaker (speaker), the acoustical feedback path from loudspeaker to microphone(s) and through the microphone.(mic). The feedback estimator unit (FBest) is configured to provide a control signal (CS) to a valve control unit (VC). The valve control unit (VC) is further configured to regulate a valve (valve), which is configured to open and close the hearing device (HD) vent channel (vent), on a basis of the control signal (CS). The valve can also be configured to be partially open.

Figure 4:
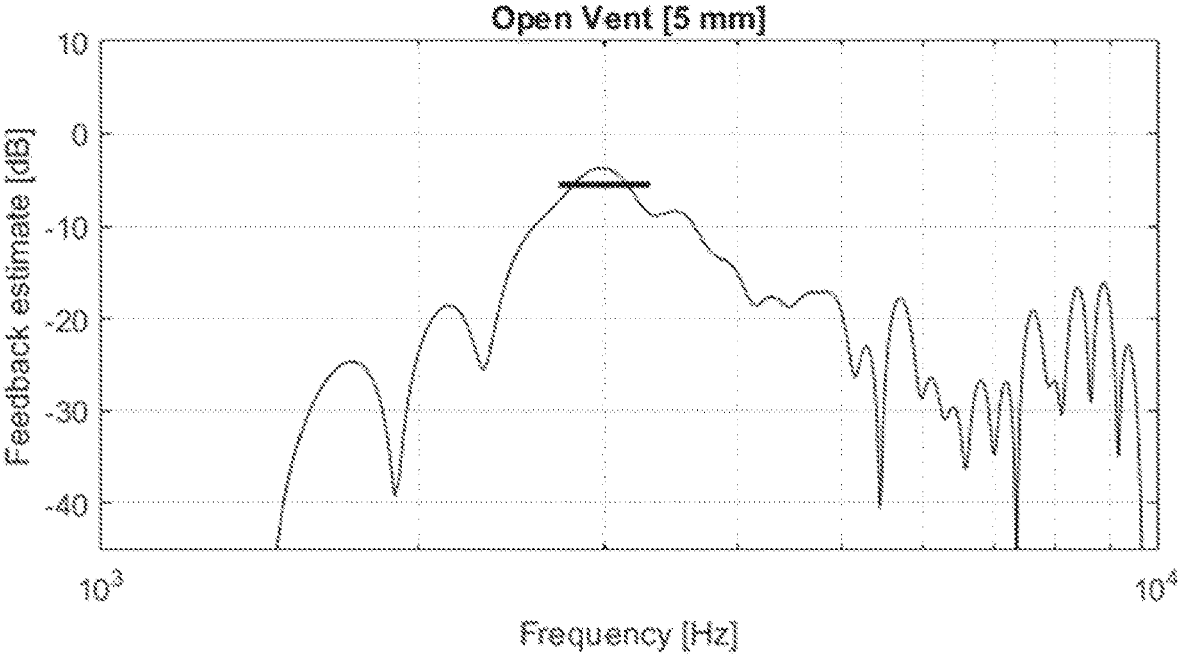
FIG. 4 shows a feedback estimate in the frequency domain (between 1 kHz and 10 kHz, on a logarithmic scale) for a vent channel size equivalent to Ø5.0 mm (open state of valve)
Figure 5:
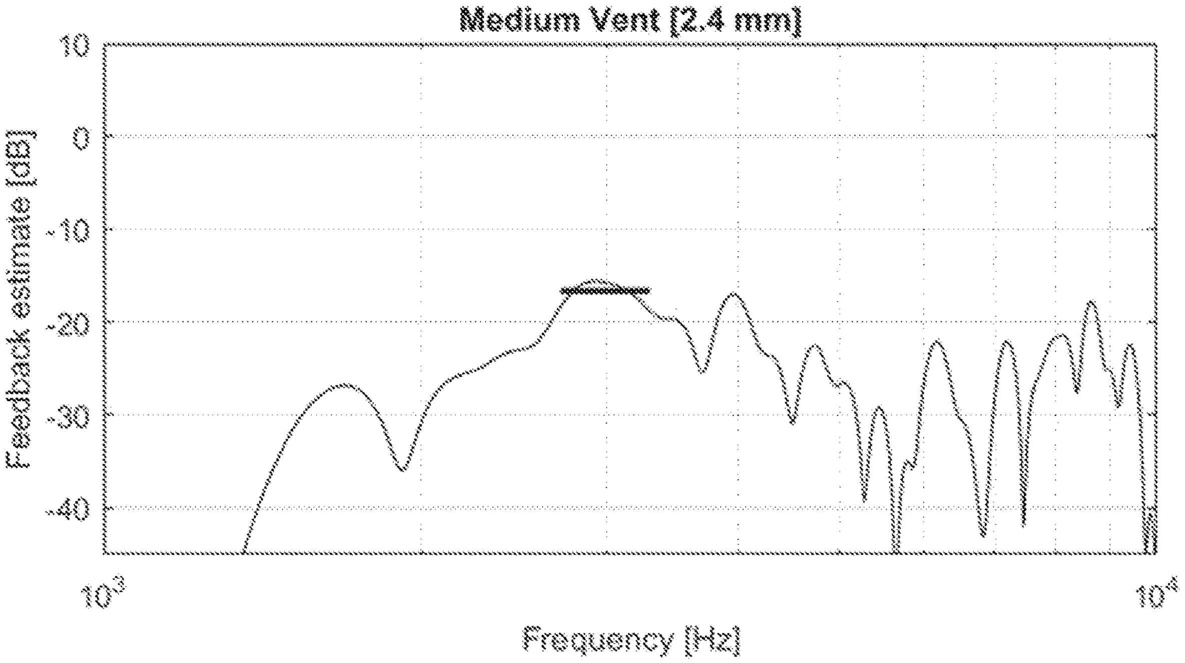
FIG. 5 shows a feedback estimate in the frequency domain (between 1 kHz and 10 kHz, on a logarithmic scale) for a vent channel size equivalent to Ø2.4 mm (medium state of valve)
Figure 6:
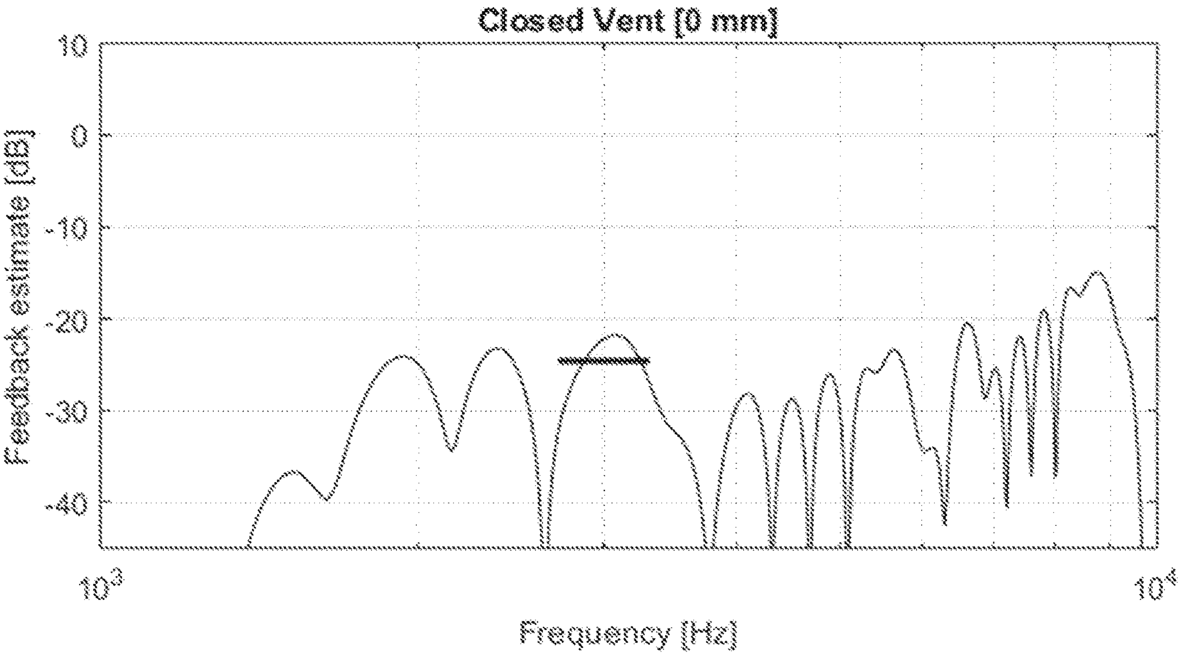
FIG. 6 shows a feedback estimate in the frequency domain (between 1 kHz and 10 kHz, on a logarithmic scale) for a vent channel size equivalent to Ø0.0 mm (closed state of valve)

One way that the valve control unit (VC) can use the control signal (CS) from feedback estimator unit (FBest) to control the valve (valve) is to first convert the control signal (CS) from the feedback estimator unit into the frequency domain (or to provide the feedback estimate in the frequency domain in the first place). In the case where the control signal (CS) is a time domain signal (e.g. an impulse response), a fast Fourier transformation (FFT) algorithm may be used to transform it into the frequency domain (to provide a frequency response of the feedback path as illustrated in FIGS. 4, 5, 6). The valve control unit (VC) can then select a frequency (e.g. 3 kHz as illustrated in FIG. 4-6 by the bold horizontal line segments at 3 kHz indicating the level of feedback at this frequency for three different states of the controllable vent, respectively), a number of frequencies, or a frequency range that is relevant (e.g. important for indicating an amount of feedback) for determining whether an action is needed for changing the vent channel opening.

The acoustic feedback travels to the microphone (mic) through two basic feedback paths (cf. dashed paths in FIG. 1 from the loudspeaker to the microphone). The first path is related to the leakage between the hearing device (HD) earpiece and the ear canal (EC) and other constant ways of transmitting the acoustic feedback from the loudspeaker (speaker) to the microphone (mic), which is indicated by FBleak. The other path is through the vent channel (vent) and the valve (valve), which is indicated by FBvent. In the case of the FBvent path the acoustic feedback is strongly dependent on a valve state, that is whether it is open (cf. 'Open' state in FIG. 4), closed (cf. 'Closed' state in FIG. 6) or partially open (cf. 'Medium' state in FIG. 5). In general, it is not important to know how much of the acoustic feedback comes from one path or the other. The important thing to know is that the acoustic feedback may vary and it's variation must be taken into account and predicted.

The embodiment of FIG. 1 allows to dynamically adjust the vent channel in dependence of a current feedback estimate. It is beneficial to (e.g. repeatedly, and/or on demand from a user, e.g. via a user interface) provide or update a current feedback estimate. This may be due to the fact, that the hearing device is able to move within the ear canal (and/or that the acoustic environment of the user changes), whereby acoustic feedback may vary. By controlling the valve, it is possible to adjust the amount of acoustic feedback (FBvent) through the vent channel by adjusting the valve to keep total acoustic feedback at a desired (or acceptable) level. Such feedback estimation can also be used to determine (estimate) how open the valve is.

Figure 2:
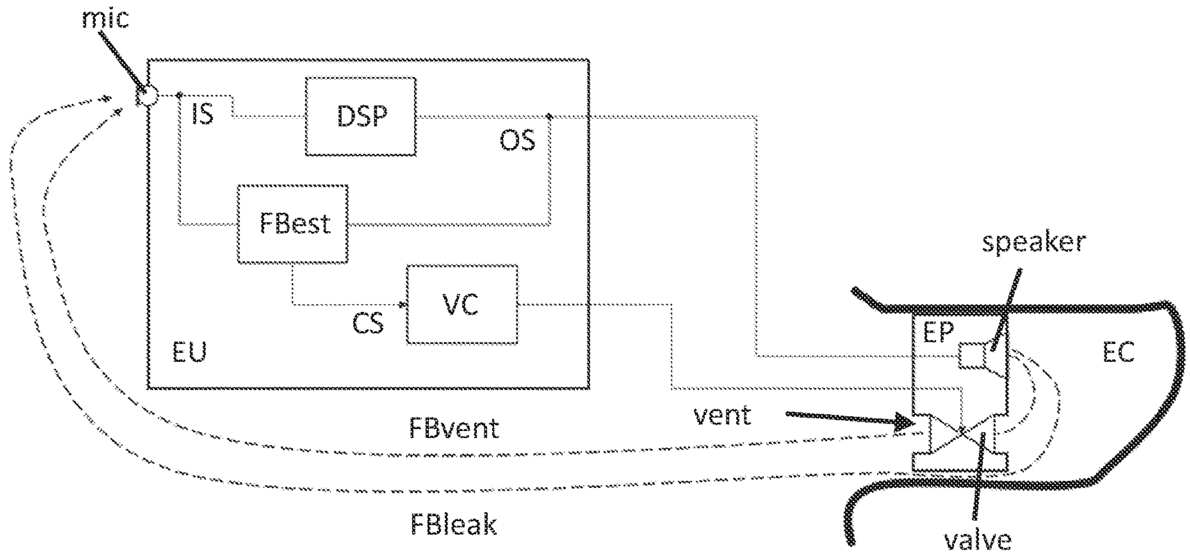
FIG. 2 shows a second example of a hearing device according to the present disclosure comprising a feedback estimation unit.

FIG. 2 shows another example of a hearing device according to the present disclosure. The hearing device in this embodiment comprises the same functional elements as shown in FIG. 1, namely a microphone (mic), a digital signal processor (DSP), a feedback estimator unit (FBest), a loudspeaker (speaker), a valve control unit (VC), and a vent comprising a (electrically controllable) valve (valve). The elements are connected to each other in the same manner as in FIG. 1. In this embodiment the hearing device comprises two (physically separate) parts—an external unit (EU) and an earpiece (EP). In the external unit (EU), the microphone (mic), the digital signal processor (DSP), the feedback estimator unit (FBest) and the valve control unit (VC) are comprised within a first enclosure. The earpiece (EP) comprises the loudspeaker and the vent channel with the valve (valve) within a second enclosure. An output signal (OS) and the control signal from valve control unit (VC) are delivered to the earpiece (EP) to the loudspeaker and the valve, respectively. Those signals may be transferred by wire or wirelessly.

Figure 9:
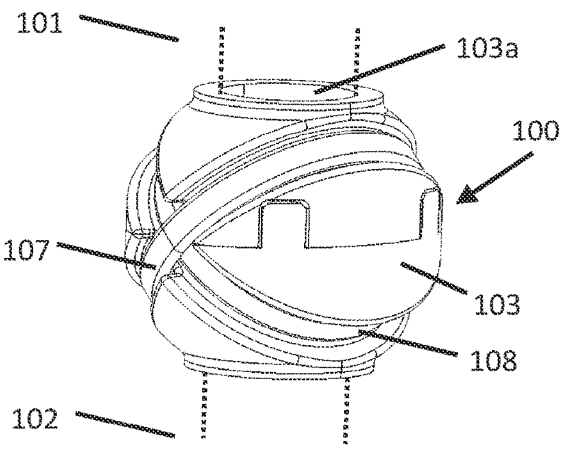
FIG. 9 shows a first valve embodiment, namely a ball valve.

This embodiment may be beneficial in the case where it is desired to minimize total feedback. Placing the external unit (EU) further away from the loudspeaker will make feedback routes longer and therefore resulting in higher feedback attenuation. This embodiment is also beneficial in cases where there is a need for high gain in the hearing device (e.g. due to a severe hearing impairment of the user) and the hearing device cannot be enclosed only within the earpiece due to a large size of components such as the speaker and/or the battery/batteries. In yet another example it may be beneficial to place the microphone, or microphones, in different locations, for example one facing toward front and one facing toward the rear/side, like it is used in the BTE, as it is shown (FIG. 9). Further, those microphones may have different characteristics which may enable a user to better hear sounds coming from one side or to better attenuate unwanted noise by making the noise easier to distinguish.

It should be noted that FIG. 1 and FIG. 2 illustrate an exemplary placement of the mentioned parts/units, and that a person skilled in the art will understand that other ways of arranging the elements/units in the external unit and/or in the earpiece are possible.

Figure 3:
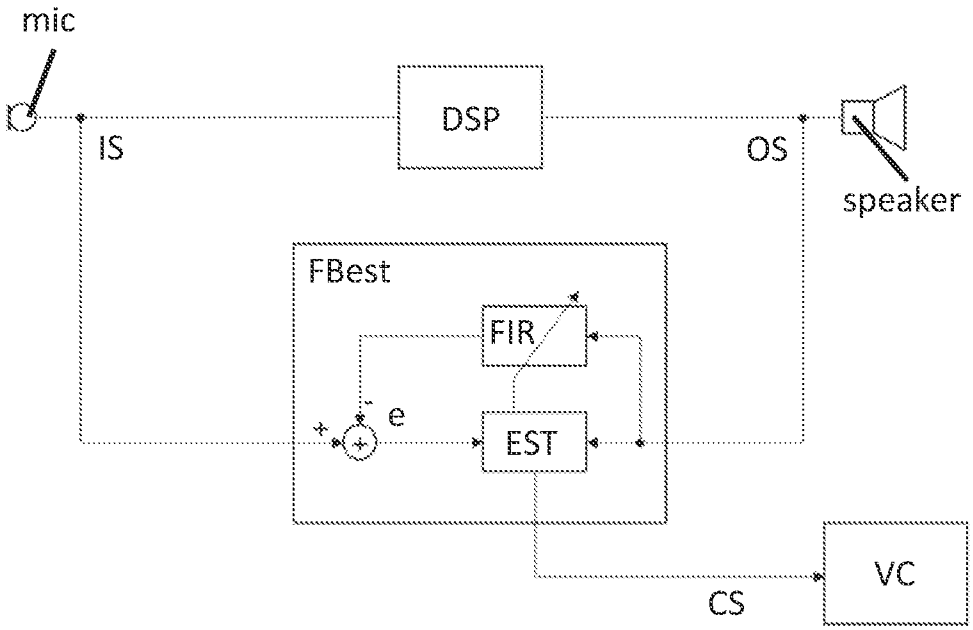
FIG. 3 shows a third example of a hearing device according to the present disclosure comprising a feedback estimation unit.

FIG. 3 shows the feedback estimator unit (FBest) in more detail. In this embodiment the feedback estimator comprises estimator block (EST) and finite impulse response filter (FIR). The output signal (OS) is applied to the finite impulse response filter (FIR) with configurable filter coefficients. A filtered signal is subtracted from the input signal (IS), which results in an error signal (e) which is delivered to the estimator block (EST). The estimator block (EST) is configured to minimize the error signal (e) by adaptively changing parameters (e.g. filter coefficients) of the finite impulse response filter (FIR). The feedback estimator unit (FBest) provides a control signal (CS) to the valve control unit (VC). This may e.g. be the estimate of the current feedback path (e.g. the output of the FIR-filter), cf. e.g. FIGS. 4, 5, 6 for different states of the valve. In that case, the valve control unit (VC) is configured to extract a measure for the amount of feedback for the current setting of the valve, and to decide whether to increase or decrease the vent cross section or to leave it as it is. This may e.g. be done on the basis of the current feedback estimate (e.g. at one or more predefined frequencies (e.g. at 3 kHz as indicated in FIG. 4-6, or e.g. by integration over a frequency range, e.g. between 2 and 8 kHz, etc.).

FIG. 4-6 show examples of how the feedback estimate in the frequency domain looks with three different vent channel openings. In FIG. 4, the vent channel size is equivalent to a Ø5.0 mm standard 19 mm long vent channel, and here the average feedback estimate from 2.8-3.2 kHz is around −6 dB. In FIG. 5, the vent channel size is equivalent to a Ø2.4 mm standard 19 mm vent channel, and here the average feedback estimate from 2.8-3.2 kHz is around −17 dB. Finally, in FIG. 6, the vent channel is closed and the feedback estimate is around −24 dB in the same frequency range around the 3 kHz peak. When the vent channel is closed there would still be feedback present from the potential leakage between the earpiece and the ear canal wall. The accuracy of the feedback estimate would usually also drop at lower levels of feedback.

Figure 7:
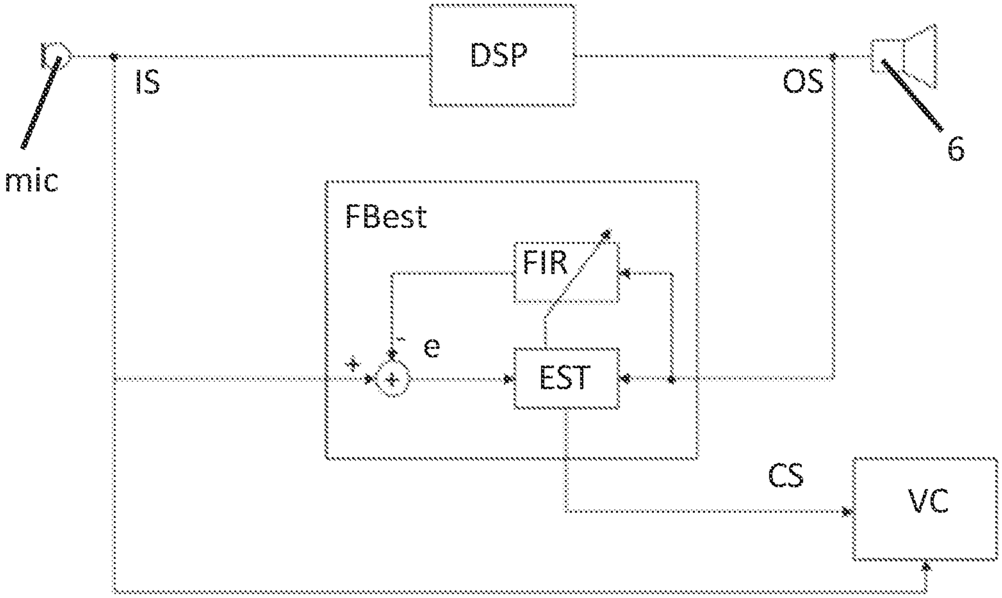
FIG. 7 shows a fourth example of a hearing device according to the present disclosure, which uses a plurality of control signals.

FIG. 7 shows one way to improve feedback estimation. In this figure, a solution similar to the one illustrated in FIG. 3 is presented, where additionally the input signal (IS) is provided to the valve control unit (VC). There are situations in which it is difficult to correctly estimate the acoustic feedback, e.g. when some external sounds make it difficult for the system to adapt correctly, especially pure tones. To avoid this, an additional input from the microphone(s) can be delivered to the vent channel control unit (VC), which may be configured to only allow to change the vent channel size when the acoustical situation is acceptable, e.g. when an external sound pressure level is below a certain threshold, and/or when no pure tones are present in the relevant frequency range.

Figure 8:
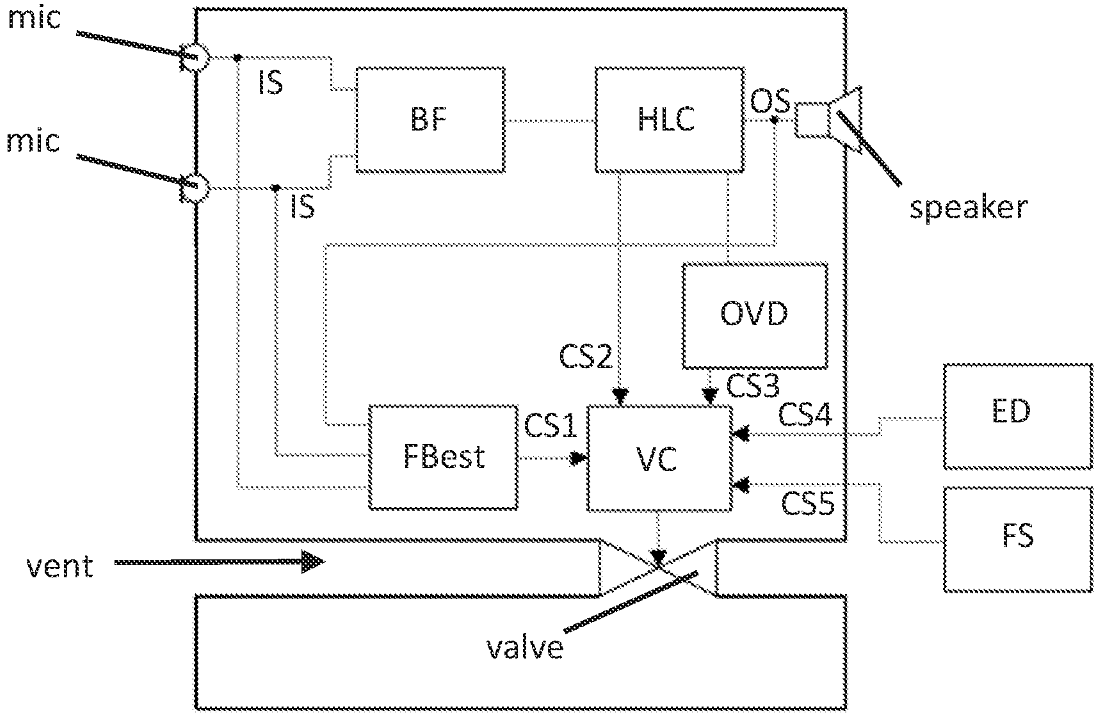
FIG. 8 shows a fifth example of a hearing device according to the present disclosure, which uses a plurality of control signals.

FIG. 8 shows yet another implementation of the present disclosure. In this figure, a hearing device (HD) is presented comprising two microphones (mic), a beamformer (BF), a hearing loss compensation unit (HLC), an own voice detector (OVD), the feedback estimator unit (FBest), the valve control unit (VC), the vent channel with the valve (valve) and the loudspeaker (speaker). Input signals are delivered from the microphones (mic) to the beamformer (BF), which delivers a combined (spatially filtered) signal based on the microphone signals to the hearing loss compensation unit (HLC). The hearing loss compensation unit (HLC) is configured to adjust (compensate for a hearing impairment) the spatially filtered signal and to deliver the compensated signal (OS) to the loudspeaker (speaker). Such connected elements/units can be found in a typical forward path of a state of the art hearing aid. The feedback estimator unit (FBest) is configured to receive input signals (IS) from the microphones and (compensated) output signal (OS) from the hearing loss compensation unit (HLC), and the feedback estimator unit (FBest) is configured to provide a first control signal (CS1) in the same manner as in the FIGS. 1-3. A further control signal (CS2) is also provided by the hearing loss compensation unit (HLC), which is configured to provide the signal on a basis of, for example, a set gain (e.g. a requested gain according to the needs of the user in view of a hearing impairment). When gain is lowered, it may enable to open the valve more. The own voice detection unit (OVD) is configured to provide another control signal (CS3) on a basis of received signal from the hearing loss compensation unit (HLC). In the case when a user is talking and the valve is completely closed, the user will typically experience an occlusion effect, which will lower a comfort of the user. While the user is talking it might be beneficial to temporarily open the valve to prevent the occlusion effect from arising (the gain of the hearing loss compensation unit (HLC) may simultaneously be reduced). It is also possible to detect a sound level in a user environment and to attenuate that sound if it is too loud.

Control signals (CS4, CS5) may also be delivered from external sources such as an external device (ED) or a fitting software system (FS). In the case of the external device (ED), such as a telephone, smartphone, television, or a computer, it is possible to stream sound directly to the hearing device. In such cases, the user may like to attenuate external sounds and closing the valve may be a desired action (e.g. automatically initiated, or initiated via a user interface, e.g. implemented on an external device, e.g. the device from which the sound is streamed, e.g. a smartphone or a similar device). In the case of the fitting software system (FS), a hearing care professional (HCP) may wish to limit the valve performance by limiting how close or how open it can be, or both. The limits may vary in dependence of a level of a user's hearing loss, the hearing aid type, a dome type and/or an ear mould, or of a hearing loss type or of user preferences.

It should be noted that not all control signals (CS) from the embodiment provided in FIG. 8 must be implemented in a hearing device. It should also be noted that some control signals (CS) might override other control signals (CS). For example, a valve operating limit set by a HCP might override feedback estimator unit (FBest) control signal (CS). In every case priority of each control signal (CS) may be set individually and may be permanent or programmable. The priority may e.g. be implemented as weights applied to the individual control signals.

In disclosed figures, separate units such as a digital signal processor, a feedback estimator unit, a valve control unit are shown as separate units. A person skilled in the art will understand that all or some units may be combined into, for example, one processor which is configured to perform the same tasks as every independent unit presented in this disclosure.

It is possible to pair two hearing devices in a binaural hearing system implementing teachings of the present disclosure. In such configuration those paired hearing devices may open and close their respective valves simultaneously (e.g. by exchanging their control signals, e.g. via an inter-aural link, and synchronizing their resulting valve control signals). In an embodiment, the valve control signal is determined in one of the two hearing devices of the binaural hearing system and transferred to the other (dependent) hearing device. It may be beneficial because of simpler design of the 'dependent hearing aid'.

A person having ordinary skill in the art will understand that in a hearing device there are also additional elements needed for proper performance of the hearing device such as a battery or batteries, a power supply or conversion unit, or an anti-feedback unit. In the hearing device, it is also possible to have other, additional features/units such as programing interface to modify a processor's program, a wireless interface such as Wi-Fi, Bluetooth or other suitable interfaces. Some of the mentioned units/features are not shown in figures in order to keep figures as simple and easy to understand as possible. For the same reason there is only, for example, only one microphone in some of the figures—a person skilled in the art will understand that more than one microphone or speaker may be used.

Used in this disclosure, the term control signal may be understood as analog or digital data, signal or indication (e.g. binary, e.g. true/false) that some condition has been met. A person skilled in the art will understand that a nature of the control signal may be different with each unit configured to generate such signal and in different implementations.

It is intended that the structural features of the devices described above, either in the detailed description and/or in the claims, may be combined with steps of the method, when appropriately substituted by a corresponding process.

As previously described, the valve is configured to open and close the vent formed by a vent channel through which sound may escape. The valve may be configured and incorporated into the hearing aid in a plurality of different ways, wherein some exemplary embodiments will be described in the following. It should be noted that all of the mentioned embodiments of a valve as described in the following may be controlled by the valve control of the hearing aid as described in previous sections. Furthermore, additional embodiments falling within the scope of these examples may be contemplated.

Figure 10:
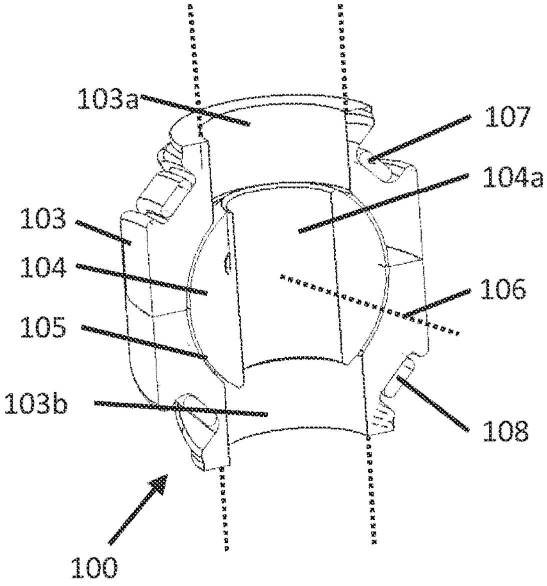
FIG. 10 shows a cross-section of the ball valve.

FIGS. 9 and 10 show a first valve embodiment, namely a ball valve. FIG. 9 shows the ball valve and FIG. 10 shows a cross-section of the ball valve. In this embodiment the vent comprises two portions—first vent portion 101 and second vent portion 102, which are separated from each other with a valve 100. The valve comprises a valve housing 103, which comprises inner space 105. Within this inner surface 105 a rotatable ball 104 is placed. The ball 104 is being able to rotate about a ball rotation axis 106. The ball 104 comprises a passage 104*a* which is a hallow canal extending through the ball 104. The housing 103 of the valve 100 comprising a first opening 103*a* and a second opening 103*b*, wherein the first opening 103*a* connects the passage 104*a* with the first vent portion 101 and the second opening 103*b* with the second vent portion 102. The ball 104, at a first rotation position where the passage 103*a* is perpendicular to a vent axis, blocks a connection between the first opening 103*a* and the second opening 103*b*, and at a second position, where the passage 103*a* is align with the valve axis, the passage 104*a* connects the first opening 103*a* and the second opening 103*b* defining a passage axis. The valve 100 comprises an actuator configured to rotate the ball 104. The valve control unit VC is configured to control and drive the actuator.

The first rotation position may be desired when a user of a hearing device comprising such valve would like to stream sound directly to the hearing device. When the user decides to speak the valve 100 should be open, so an occlusion effect would not appear. The hearing device comprising the valve 100 would be able to quickly change from being closed, in the first rotation position, to being open, in the second rotation position, when the necessity arises such as the user starts speaking or other mention hereinbefore.

In FIG. 10 it can be seen that the ball 104 has a spherical shape and the passage 104*a* has a circular cross-section shape. It should be noted that the ball 104 may have any axially symmetrical shape, such as a cylindrical shape or ellipsoid shape. Also the passage 104*a* may have any shape—it may have the cross-section of any shape and also the passage may be curved, straight or in any spatial shape which allows connection of the first opening 103*a* and the second opening 103*b*.

It should be noted that the first rotation position does not have to fully block the connection between the first opening 103*a* and the second opening 103*b*, and the second rotation position does not have to fully connect the first opening 103*a* and the second opening 103*b*. It is important that the valve may provide a possibility to limit a sound passing through. The specific lower (the first rotation position) and upper (the second rotation position) limit is to be defined in every single hearing device.

Figure 11:
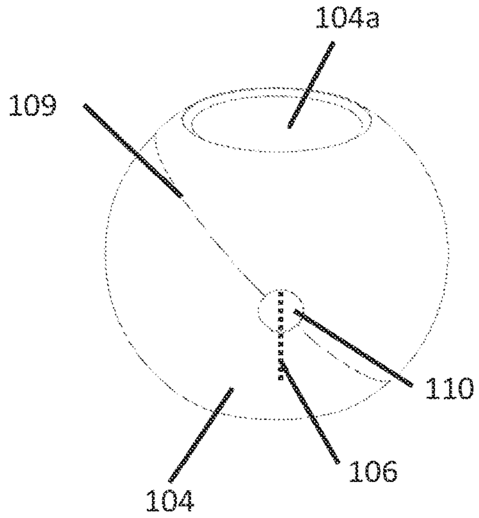
FIG. 11 shows a ball of the ball valve.

In another embodiment the valve 100 may comprise at least one, preferably two pins. This pin(s) provides a pivot bearing along the ball rotation axis 106. This bearing is provided between the inner space 105 and the ball 104. This pin(s) may be a part of the ball 104, the inner surface 105 or be third, separate part. In the case in which the pin(s) is not part of the ball 104, the ball 104 may comprise slot(s) 110, as shown in FIG. 11. When the pin is firmly connected to the ball 104 it may be used to transmit torque from the actuator.

In another embodiment the ball 104 may be a magnet. The valve actuator may comprise a first electromagnetic coil 107 and a second electromagnetic coil 108, both wounded around the housing 103 such that when the first electromagnetic coil 107 is driven by the valve control unit VC and the second electromagnetic coil 108 is not driven, the ball 104 takes the first rotation position, and if the second electromagnetic coil 108 is driven and the first electromagnetic coil 107 is not driven, the ball 104 takes the second rotation position. In this arrangement ball 104, being the magnet, aligns with the magnetic field created by the first electromagnetic coil 107 or the second electromagnetic coil 108. In this case the ball 104 acts as a rotor in an electrical motor.

It the case when the first electromagnetic coil 107 is driven and the second electromagnetic coil 108 is driven, the ball 104 takes a third rotation position between the first rotation position and the second rotation position corresponding to a proportion of magnetic fields generated by the first electromagnetic coil 107 and the second electromagnetic coil 108. By driving both electromagnetic coils in this manner it is possible to achieve intermediate position of the ball resulting in a different sound attenuation varying from a minimal attenuation when the valve 100 is fully open (the second position) to maximal attenuation when the valve 100 is fully closed, blocked (the first position).

FIG. 11 shows a ball 104 in more details. This figure shows a plane 109 separating north and south magnetic poles N, S of the ball 104. This plane is angled by 45 degrees with respect to a passage 104*a* axis about the ball rotation axis 106. This arrangement of magnetic poles allows to wound the first electromagnetic coil 107 and the second electromagnetic coil 108 in convenient and easy to assembly place. It should be understand that with different valve design it may be beneficial to arrange differently how those magnetic poles are positions on a ball 104.

In another embodiment the ball 104 may be in a frictional contact with the inner space 105 such that, if the actuator is not driven, preferably when the first electromagnetic coil 107 is not driven and the second electromagnetic coil 108 is not driven, a rotation position of the ball 104 is maintained.

It should be noted that this particular usage of a valve does not need constant power consumption. After a new rotation position is established the first electromagnetic coil 107 and the second electromagnetic coil 108 do not have to be powered. A torque between the ball 104 and the inner surface 105 is high enough to keep the ball 105 in the new rotation position. It should also be noted that an air flow passing through the valve 100 will have small volume and speed thus the forces acting on a ball 104 will be small and the torque between the ball 104 and the inner surface 105 will be sufficient to keep the ball in a desired rotation position.

In yet another embodiment the passage 104*a* axis may go through a ball 104 geometric center. This arrangement, with the passage 104*a* being straight canal, provides the least resistance to air passing through the valve 100 and enables the biggest possible passage 104*a* in this type of the valve 100.

Figure 12A:
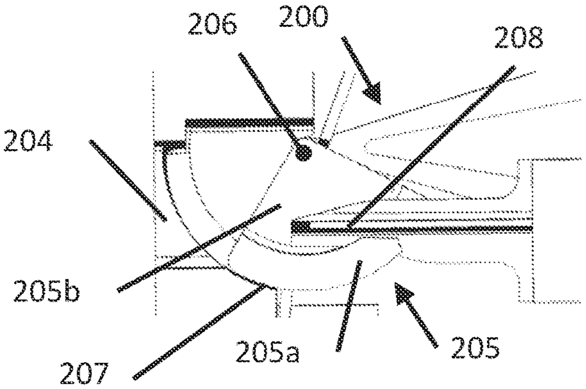
FIG. 12A shows a second valve embodiment, namely a cradle valve, in an open position.
Figure 12B:
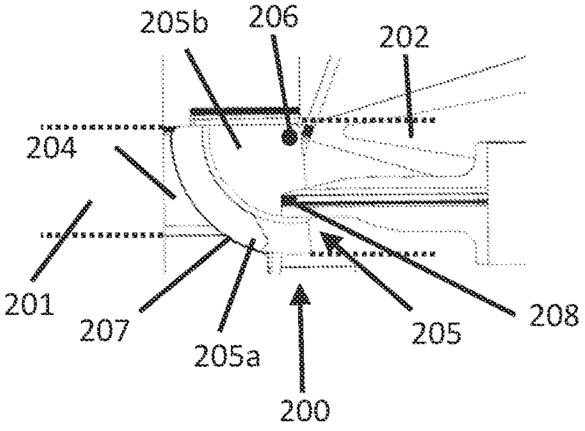
FIG. 12B shows the cradle valve in a partially open position.
Figure 12C:
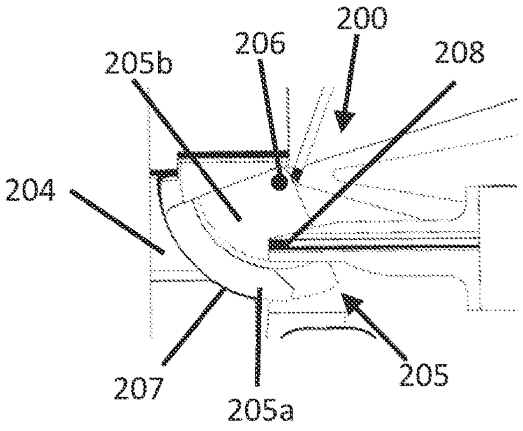
FIG. 12C shows the cradle valve in a closed position.

FIGS. 12A, 12B, 12C show a second valve embodiment, namely a cradle valve. This embodiment the vent comprises a first vent portion 201 and a second vent portion 202 separated by the valve 200. A valve housing 203 may have an opening 204 connecting the first vent portion 201 with the second vent portion 202. The valve 200 comprises a lid unit 205 rotatable about a lid unit rotation axis 206. The lid unit 205 comprises a cylinder side surface section 205*a* and a supporting section 205*b* extending toward the lid unit rotation axis 206. The lid unit rotation axis 206 is in a center of an imaginary cylinder which comprises the side surface section 205*a*. At a first rotation position of the lid unit 205 it covers the opening, and at a second rotation position of the lid unit 205 it uncovers the opening. The valve 200 comprises an actuator configured to rotate the lid unit 205, and the valve control unit VC is configured to control and drive the actuator.

FIG. 12A shows the cradle valve in an open position, wherein the lid unit 205 is in the first position, which allows air to pass through the valve 200 with the least resistance caused by the cylinder side surface section 205*a*. FIG. 12B shows the cradle valve in partially closed position, wherein the lid unit 205 is in an intermediate position which creates a resistance to an air passing through. This resistance depends on the lid unit 205 position and may be adjusted in particular situations, such as when the environment sound is getting louder and a reduction of a sound reaching a user's tympanic membrane is desired. FIG. 12B shows the cradle valve in a closed position, wherein the lid unit 205 is in the second position, which blocks the air from passing through the valve 200.

In embodiment a portion of an inner wall 207 of the valve 200 is formed to correspond to a shape of the cylinder side surface section 205*a* of the lid unit 205. This inner wall shape allows to minimalize the resistance caused by the lid unit 205 while being in the first position. This solution allows the lid unit 205 to be partially covered by the inner wall 207 thereby reducing the resistance.

In yet another embodiment the inner wall 207 is in a frictional contact with the lid unit 205 cylinder side surface section 205*a*. This feature allows to reduce a power consumption by enabling the actuator to be turned off after a desired position of the lid unit 207 was achieved. The frictional contact will be able to prevent undesired movement of the lid unit 206 caused by an air movement.

In another embodiment the valve 200 comprises a pin providing a pivot bearing between the valve 200 and the supporting section 205*b* of the lid unit 205.

In another embodiment the valve actuator comprises an electrical motor, preferably a stick slip motor including a piezo element, and a movement transmission element 208 connected to the motor.

In yet another embodiment the valve control unit VC is configured to drive the piezo element based on the control signal CS to cause the lid unit 205 to approach one of the first rotation position, the second rotation position, and a third rotation position between the first rotation position and the second rotation position by an alternating extension and contraction of the piezo element.

In yet another embodiment, depending on an approach direction, the extension of the stick slip motor is slower than the contraction or the contraction is slower than the extension.

FIGS. 13A-13C and 14A-14C show a third valve embodiment, namely a piston valve. In this embodiment the vent 301 may be configured as part of a speaker unit 304, but it also may be a separate part, of the hearing device. The speaker unit 304 comprises a snout 305 within which the vent 301 extends in a longitudinal direction of the snout 305. The vent 301 is configured as a bore and the valve 300 is configured to be arranged within said bore.

In embodiment the valve 300 may comprise a piston unit 303 movable along the longitudinal axis of the vent 301 portion. A cross section of the piston unit 303, perpendicular to the longitudinal axis of the vent 301 corresponds to a bore cross section of the bore to thereby allow the piston unit 303 to slidably fit into the bore of the vent 301. The piston unit 303 being able to occlude, at least partly and/or in full, the vent 301 by moving inside the vent 301 from a distal end 301*a*, positioned near an ear canal entrance, of the vent 301 to a proximal end 301*b*, positioned near to the tympanic membrane. The valve 300 comprises an actuator configured to move the piston unit 303.

In yet another embodiment an end surface of the piston unit 303 may have a curved surface 303*a*. The curved surface 303*a* may be any non-planar surface which allows to better control how open or close the valve 300 is. In the case of planar end surface of the piston unit 303 there is very short distance between valve 300 being fully open and fully closed. In the case of curved surface 303*a* it is possible to extend this distance between valve 300 being fully open and fully closed. It is also possible to define this surface in such manner that a function of closing the valve 300, with relation to the position of the piston unit 303, is a linear function, logarithmic function etc.

In another embodiment the snout 305 may comprise a slit opening. One side of the slit opening is curved so as to form the substantially v-shaped cut-out 302 in the snout 305. The piston unit 303 is configured to at least partly and/or in full to cover the cut-out. The purpose of the slit opening is similar to the curved surface 303*a*, that is a better control of the valve 300. The shape of the slit opening may also be defined such that, alone or in the combination with the curved surface 303*a*, may provide a specific function of closing the valve 300, with relation to the position of the piston unit 303.

Figure 13A:
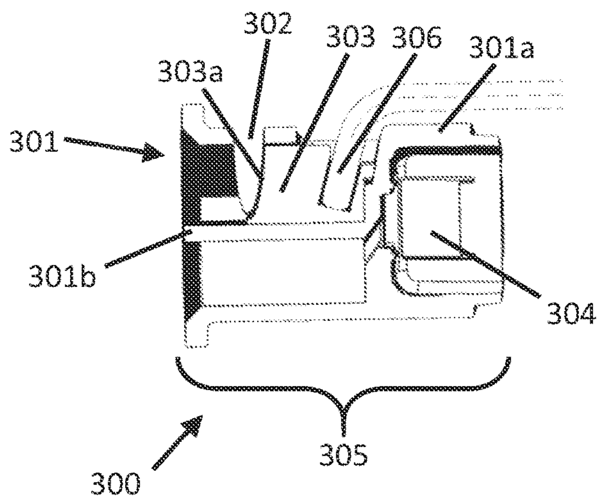
FIG. 13A shows a cross-section of a third valve embodiment, namely a piston valve, in an open position.
Figure 13B:
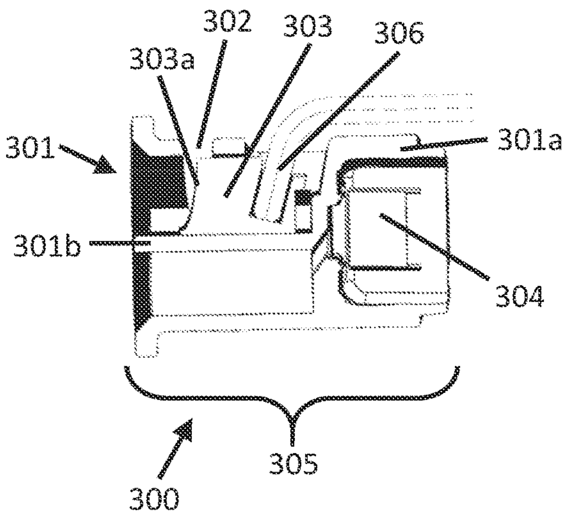
FIG. 13B shows a cross-section of the piston valve in a partially open position.
Figure 13C:
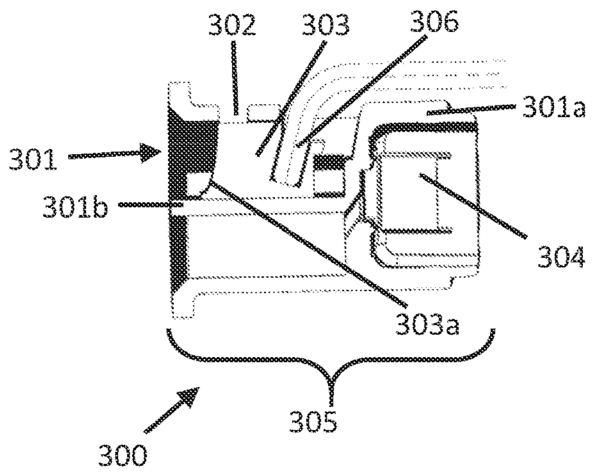
FIG. 13C shows a cross-section of the piston valve in a closed position.
Figure 14A:
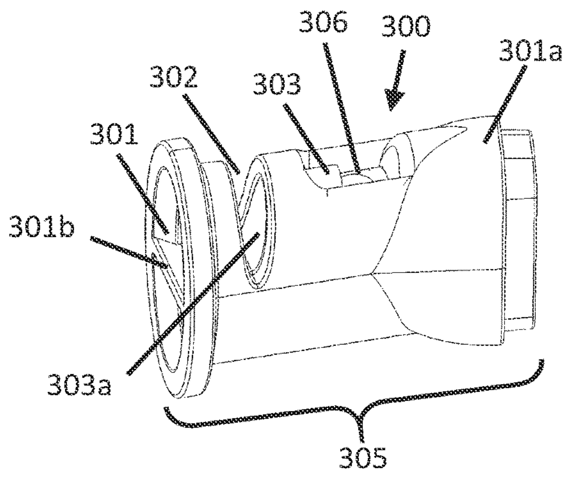
FIG. 14A shows the piston valve in an open position.
Figure 14B:
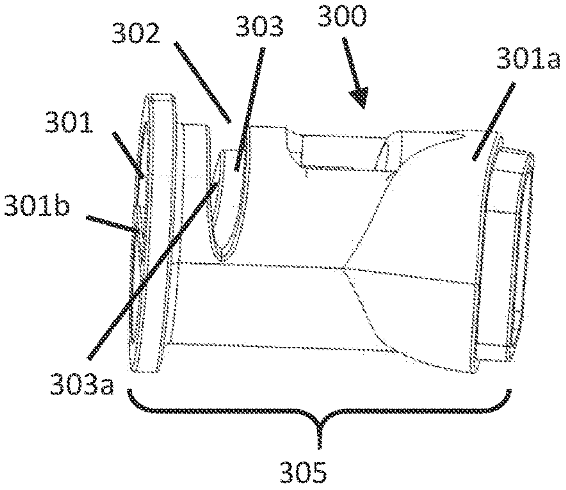
FIG. 14B shows the piston valve in a partially open position.
Figure 14C:
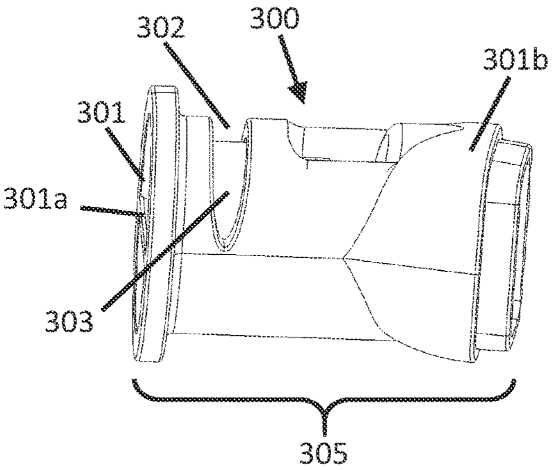
FIG. 14C shows the piston valve in a closed position.
Figure 15A:
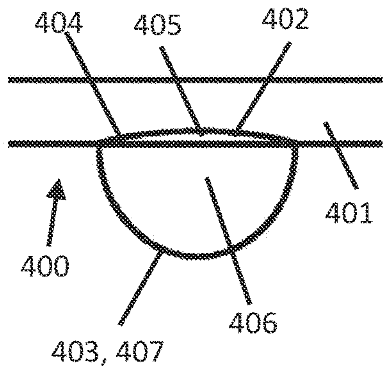
FIG. 15A shows a cross-section of a fourth valve embodiment, namely a membrane valve, in an open position.
Figure 15B:
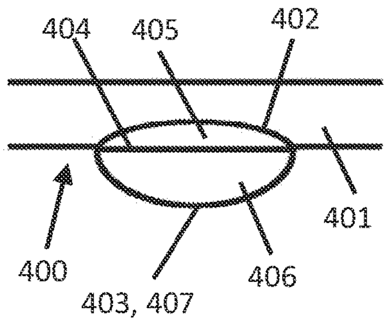
FIG. 15B shows a cross-section of the membrane valve in a partially open position.
Figure 15C:
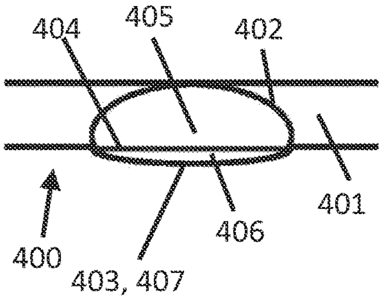
FIG. 15C shows a cross-section of the membrane valve in a closed position.
Figure 16A:
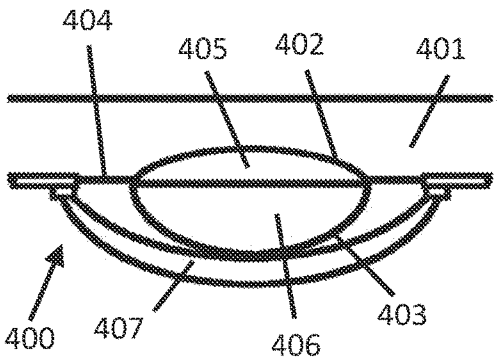
FIG. 16A shows a cross-section of a second example of the membrane valve in an open position.
Figure 16B:
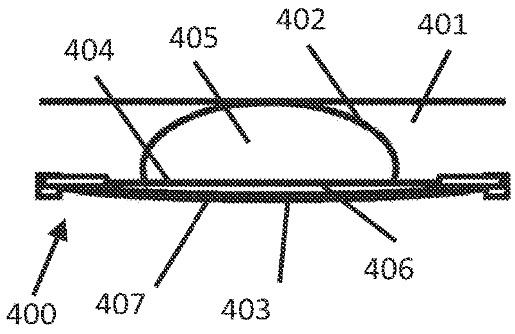
FIG. 16B shows a cross-section of the second example of the membrane valve in a closed position.

In yet another embodiment the valve 300 may be configured to be moved into at least a closed position, and open position and an intermediate position. When in a closed position, the valve 300 occludes the vent in full, in an intermediate position, the valve 300 at least partly occludes the vent, and in an open position, the valve 300 leaves the vent open. In FIG. 13*a* the valve 300 is shown in fully open position. The piston 303 is in the most distant position with respect to the proximal end 301*b* and a opening or a v-shaped cut-out 302 have the biggest size providing the least resistance to air passing through the valve 300. In FIG. 13*b* the piston 303 is in intermediate position. The opening is partially closed limiting the amount of an air and a sound passing through. In FIG. 13*c* the piston 303 is in the closest position with respect to the proximal end 301*b*. The opening is fully covered by the piston 303 and the valve 300 is closed.

In another embodiment the curved end surface 303*a* of said piston unit 303 is configured to provide a smooth transition of air passing into the vent 301 and escaping through the vent 301.

In yet another embodiment the valve 300 comprises a piston guide 306 configured to be actuated by the control unit, wherein upon actuation by the control unit, the valve piston guide 306 acts on the piston unit 303 so as to force the piston unit 303 into a closed position, an open position or a partly open position. It should be mentioned that piston guide 306 of this shape is merely an example and the person skilled in the art would came up with other actuators types and different parts shape that are configured to provide linear movement of the piston 303.

Figure 17A:
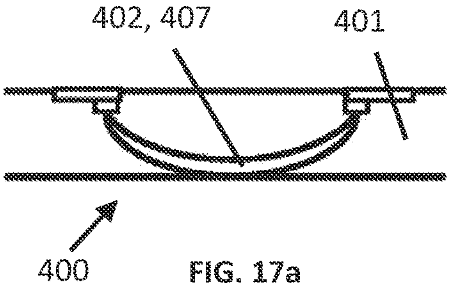
FIG. 17A shows a cross-section of a third example of the membrane valve in a closed position.
Figure 17B:
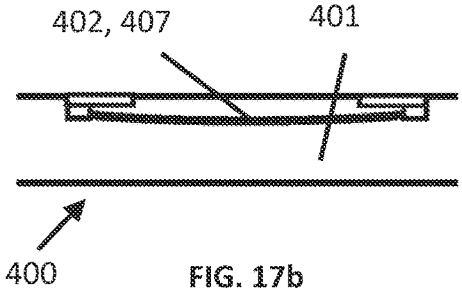
FIG. 17B shows a cross-section of the third example of the membrane valve in an opened position.
Figure 18A:
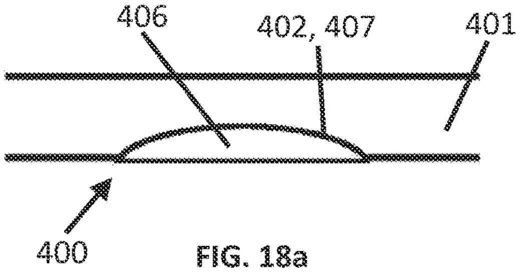
FIG. 18A shows a cross-section of a fourth example of the membrane valve in an open position.
Figure 18B:
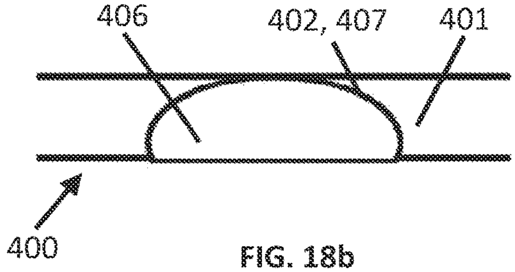
FIG. 18B shows a cross-section of the fourth example of the membrane valve in a closed position.

FIGS. 17A and 17B show a fourth valve embodiment, namely a membrane valve. The valve 400 may comprise a membrane 402 configured to open the vent 401, in a membrane shrunken state, or close the vent 401, in a membrane extended state. The membrane 402 is configured to extend and shrink within the vent 401. The membrane 402 is an actuator 407 and/or the valve 400 comprises an actuator 407 for controlling the membrane 402. In shown embodiments of the valve 400 there are embodiments in which the membrane 402 is an actuator 407 or an actuator 407 is configured to act on a membrane 402. It is also possible to have more than one membrane 402 in one embodiment and more than one actuator 407 in the valve 400.

In embodiment the valve 400 may comprise a volume defined by an inner volume 405 and an outer volume 406. The inner volume 405 is determined by the membrane 402 and a valve wall 404, and the outer volume 406 is determined by an outer membrane 403 and the valve wall 404. The volume 405 is filled with a fluid and the actuator 407 is configured to control the membrane 402 to change the outer volume 406 and push fluid into the inner volume 405. This volume acts like a balloon which is pushed on one side. By controlling force applied it is possible to adjust how open or closed the valve 400 is.

It should be noted that this solution may be achieve by inserting a balloon-like, field with liquid and sealed membrane 402, 403, which is placed in the opening of a valve wall. The opening should, preferably, be rounded and do not have corners. Examples of preferred shapes are an ellipsis or a circle.

The other possibility is to attach both membranes 402, 403 independently to the valve wall, one membrane 402 to one side of the valve wall and other membrane 403 to other side of the valve wall, and filling created volume with a liquid.

It is also possible to have a pump within a hearing device, which could pump the liquid, such as an air or a fluid from a tank, but this solution have many disadvantages. This solution would need an additional space within, or near, the hearing device for the pump and tank. It would also require greater amount of power delivered to the pomp. Finally this solution would cause an additional noise which is not desired in hearing devices.

It should be noted that membrane 402 may be made of a polymeric material such as rubber. In this case this membrane, in fully closed state, would provide additional sealing.

In yet another embodiment the valve 400 comprises the actuator 407. In this embodiment the actuator 407 is not a membrane 402, 403, but it is a separate piece. It should be however noted that more than one actuator may be present in the valve 400. This actuator 407 may be made of an artificial muscle or a piezoelectric material. It should be noted that the person skilled in the art would know other actuators suitable for this application.

In another embodiment the actuator 407 is controlled and driven electrically, preferably is controlled and driven by a voltage.

In yet another embodiment the actuator 407 is slidably connected to a ventilation valve wall and preferably one point of the actuator is fixed to the vent wall. To allow the actuator to bend or to move it may be necessary to provide a hinge or slidably connection to the valve wall.

In another embodiment the fluid is a liquid. Due to the fact that liquids may be considered, in application like this, as incompressible, it may be beneficial to fill the volume with a liquid. This may result in smaller distances needed to fully close the valve 400. It would also make possible to determine, with greater precision, how open or closed the valve is based on a current actuator position. If the liquid is a gas then pushing membrane 403 may not result in similar and repeatable extension of the membrane 402. The liquid may help solving at least one of this problems.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing device configured to be located fully or partially in or at an ear of a user, the hearing device comprising:

at least one microphone configured to provide an input signal representing sound, a processor configured to process the input signal and provide a processed signal, at least one loudspeaker configured to receive the processed signal from the processor and to provide an acoustic signal based on the processed signal to the ear of a user, an earpiece comprising a vent, and an electrically controllable valve configured to control the vent, a valve control unit configured to receive one or more control signals in dependence of a current hearing situation of the hearing device, wherein the valve control unit is configured to adjust the electrically controllable valve in dependence of the one or more control signals to provide the vent in a state between an acoustically more open and an acoustically less open state, and an own voice detector configured to detect a voice of the user, wherein the own voice detector triggers the valve control unit to emit a control signal to the valve forcing the valve to allow the vent to become more open when voice of the user is detected.

2. The hearing device according to claim 1, wherein the own voice detector is configured to temporarily open the valve at least at times when the user is speaking.

3. The hearing device according to claim 1, comprising a hearing loss compensation unit, wherein the gain of the hearing loss compensation unit is at a reduced level, when the valve is more open; and wherein the gain of the hearing loss compensation unit is above the reduced level, when the valve is less open.

4. The hearing device according to claim 1, wherein the own voice detector is configured to temporarily open the valve at least at times when the user is speaking;

wherein at least one of the one or more control signals is obtained in dependence of a sound level estimate of a current acoustic environment of the hearing device; and wherein the gain is temporarily reduced in response to detection of a sound level above a predetermined loud sound level.

5. The hearing device according to claim 1, wherein the hearing device is configured to: close the valve in response to detecting a stream of sound from an external device.

6. The hearing device according to claim 1 configured to close the valve in response to determining a user interface initiation of an action to close the valve.

7. The hearing device according to claim 1, wherein the valve control unit is configured to adjust the valve synchronously with a user's other hearing device.

8. The hearing device according to claim 1,
wherein the hearing device comprises a feedback estimation unit, and
wherein the valve control unit is configured to determine whether the valve is open, partly open, or closed on a basis of a signal from the feedback estimation unit.

9. The hearing device according to claim 1,
wherein the valve comprises a piston unit movable along a longitudinal axis of the vent;
wherein the piston unit is able to occlude, at least partly and/or in full, the vent by moving inside the vent from a distal end, positioned near an ear canal entrance, of the vent to a proximal end, positioned near the tympanic membrane; and
wherein the valve comprises an actuator configured to move the piston unit.

10. The hearing device according to claim 1,
wherein the vent comprises:
a first vent portion and a second vent portion separated by the valve, and
a valve housing having an opening connecting the first vent portion with the second vent portion;
wherein the valve comprises a lid unit rotatable about a lid unit rotation axis, wherein the lid unit comprises a cylinder side surface section and a supporting section extending toward the lid unit rotation axis, wherein the lid unit rotation axis is in a center of an imaginary cylinder which comprises the side surface section; and wherein
at a first rotation position of the lid unit, the lid unit covers the opening, and
at a second rotation position of the lid unit, the lid unit uncovers the opening, and
wherein the valve comprises an actuator configured to rotate the lid unit, and the valve control unit is configured to control and drive the actuator.

11. The hearing device according to claim 1, wherein at least one of the one or more control signals is obtained in dependence of an input to the hearing device via an external device wherein the input is for one of an audio streaming or a telephone call.

12. The hearing device according to claim 1, wherein at least one of the one or more control signals is obtained in dependence of a level estimate of the current acoustic environment of the hearing device.

13. The hearing device according to claim 1,
wherein the vent is configured as part of a speaker unit of said hearing device, wherein said speaker unit comprises a snout, and
wherein, within said snout, said vent extends in a longitudinal direction of the snout, and is configured as a bore, wherein the valve is configured to be arranged within said bore.

14. The hearing device according to claim 1, wherein the processor comprises a hearing loss compensation unit and at least one of the one or more control signals is obtained in dependence of a gain set in the hearing loss compensation unit.

15. The hearing device according to claim 1, wherein at least one of the one or more control signals is obtained in dependence of a user hearing loss, hearing aid type, and/or an ear mould.

* * * * *